United States Patent Office
3,400,065
Patented Sept. 3, 1968

3,400,065
MIXTURES OF POLYARYLENE POLYETHERS
AND VINYLIDENE FLUORIDE-HEXAFLUO-
ROPROPENE COPOLYMERS
Bruce P. Barth, Somerville, N.J., assignor to Union
Carbide Corporation, a corporation of New York
No Drawing. Filed Aug. 23, 1965, Ser. No. 481,962
17 Claims. (Cl. 204—159.2)

ABSTRACT OF THE DISCLOSURE

Polymeric mixtures of improved strength and resistance to thermal stress embrittlement comprising from about 0.1 to 30 parts of a vinylidene fluoride-hexafluoropropene copolymer and a linear thermoplastic polyarylene polyether composed of recurring units having the formula (—O—E—O—E'—)

wherein E is the residuum of a dihydric phenol and E' is the residuum of a benzenoid compound having an inert electron withdrawing group having a sigma* value above about 0.7 in at least one of the positions ortho and para to the valence bonds.

---

This invention relates to mixtures of polyarylene polyethers and vinylidene fluoride-hexafluoropropene copolymer elastomers, and in particular to such mixtures characterized by improved notched impact strength and improved resistance to thermal stress embrittlement.

Polyarylene polyethers are substantially linear thermoplastic polymers that exhibit excellent mechanical, physical, chemical, and electrical properties, and are especially attractive for their superior thermal properties. These polymers can be molded by conventional techniques into shaped articles for a wide variety of end uses. These polymers are ductile, machinable, self-extinguishing, and non-dripping, and are inert to both mineral acid and caustic. More importantly, because of the superior thermal properties of these polymers, they retain their properties at elevated temperatures surpassing the elevated temperature capabilities of prior melt fabricable thermoplastic materials. However, it has been found that polyarylene polyethers while possessing superior thermal properties, undergo undesirable thermal stress embrittlement. That is, load bearing or stressed articles molded from polyarylene polyethers will crack and craze when exposed to the same elevated temperatures that an unstressed article would otherwise withstand. In addition, it has also been found that polyarylene polyethers are notch sensitive, that is, they exhibit relatively low Izod Impact (ASTM D256) values as compared to other engineering thermoplastic materials such as polycarbonates for example.

Unexpectedly, it has now been discovered that polyarylene polyethers are greatly improved in notched impact strength and resistance to thermal stress embrittlement by adding thereto from about 0.1 to about 30 parts by weight, based on the weight of the polyarylene polyether, of a vinylidene fluoride-hexafluoropropene copolymer containing from 30 percent to 70 percent by weight of vinylidene fluoride units and 70 percent to 30 percent by weight of hexafluoropropene units. Of note is the fact that the incorporation of these copolymers in polyarylene polyethers does not adversely effect the desirable properties of the polyarylene polyether. It was also found that the incorporation of these copolymers into polyarylene polyether improves their processability.

Thermoplastic polyarylene polyethers used in the present invention are linear thermoplastic polymers having a basic structure composed of recurring units having the formula

—O—E—O—E'— wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric penol be a weakly acidic dinuclear phenol such as, for example, the dihydroxy diphenyl alkanes or the nuclear halogenated derivatives thereof, which are commonly known as "bisphenols," such as, for example, the 2-2-bis-(4-hydroxyphenyl)propane, 1,1-bis-(4-hydroxyphenyl)-2-phenylethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, either oxygen (—O—), carbonyl (—CO—), sulfide (—S—), sulfone (—SO$_2$—), or hydrocarbon residue in which the two phenolic nuclei are joined to the same or different carbon atoms of the residue such as, for example, the bisphenol of acetophenone, the bispenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

$$\underset{\text{HO}(Ar-R-Ar)\text{OH}}{(Y)_r \quad (Y_1)_z}$$

wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4 inclusive, and R is representative of a bond between aromatic carbon atoms as in dihydroxydiphenyl, or is a divalent radical, including for example, inorganic radicals as —CO—, —O—, —S—, —S—S—, —SO$_2$—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane,
2,4'-dihydroxydiphenylmethane,
bis(2-hydroxyphenyl)methane,
bis-(4-hydroxyphenyl)methane,
bis-(4-hydroxy-2,6-dimethyl-3-methoxyphenyl)methane,
1,1-bis-(hydroxyphenyl)ethane,
1,2-bis-(4-hydroxyphenyl)ethane,
1,1-bis-(4-hydroxy-2-chlorophenyl)ethane,
1,1-bis(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane and the like;

Di(hydroxyphenyl)sulfones such as bis-(4-hydroxyphenyl) sulfone,
2,4'-dihydroxydiphenyl sulfone,
5'-chloro-2,4'-dihydroxydiphenyl sulfone,
5'-chloro-4,4'-dihydroxydiphenyl sulfone, and the like;

Di(hydroxyphenyl)ethers such as bis-(4-hydroxyphenyl)ether,
the 4,3'-, 4,2'-, 2,2'-, 2,3'-dihydroxydiphenyl ethers,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and the like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para positions of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group (—SO$_2$—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing) or other groups having a positive sigma* value, as set forth in J. F. Bunnett in Chem. Rev., 49, 273 (1951) and Quart, Rev. 12, 1 (1958).

The electron withdrawing group of the dihalobenzenoid compound can function either through the resonance of the aromatic ring, as indicated by those groups having high sigma* value, i.e. above about +0.07 or by induction as in perfluoro compounds and like electron sinks.

Preferably the activating group should have a high sigma* value, preferably about 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitroso, and hereto nitrogen as in pyridine.

(b) Divalent groups which can activate displacement of halogens on two different rings, such as the sulfone group —SO$_2$—; the carbonyl group —CO—; the vinyl group —CH=CH—; the sulfoxide group —SO—; the azo group —N=N—; the saturated fluorocarbon groups —CF$_2$—CF$_2$—; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers than are composed of recurring units having the formula

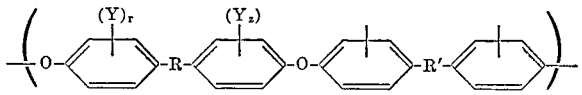

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y$_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive. Even more preferred are the thermoplastic polyarylene polyethers of the above formula wherein $r$ and $z$ are zero, R is divalent connecting radical

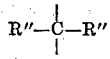

wherein R″ represents a member of the group consisting of hydrogen, lower alkyl, lower aryl, and the halogen substituted groups thereof, and R′ is a sulfone group.

Thermoplastic polyarylene polyethers described herein can be prepared as described in Belgian Patent 650,476 in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

Thermoplastic polyarylene polyethers described herein can also be prepared as described in the aforementioned Belgian Patent 650,476 in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

Thermopalstic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

The copolymers used in this invention are the rubberlike copolymers of vinylidene fluoride and hexafluoropropene containing 30%–70% by weight of vinylidene fluoride units and 70%–30% by weight of hexafluoropropene units, and more particularly the elastomeric stock consisting of 60% vinylidene fluoride and 40% hexafluoropropene. These elastomeric copolymers may be prepared in high conversions by either batch or continuous processes in which the monomers are copolymerized in aqueous systems at from 20° to 150° C. and at from 250 to 1500 pounds per square inch in the presence of polymerization initiators such as peroxy compounds, activators such as sodium bisulfite, a buffer such as disodium hydrogen phosphate, and a dispersant such as ammonium salt of a polyfluorocarboxylic acid.

Since hexafluoropropene does not homopolymerize under the conditions above mentioned, an excess of this monomer over the quantity desired in the copolymer will usually be employed. In the batch process from 60 to 15 parts by weight of vinylidene fluoride will be copolymerized with from 40 to 85 parts by weight of hexafluoropropene to give products containing from 30% to 70% by weight of hexafluoropropene.

In carrying out the reaction as a continuous process, copolymers having more uniform properties are obtained than when the process is carried out as a batch process. A satisfactory manner for producing the copolymer by the continuous process is to feed the monomers in a constant ratio (in the proportion desired in the copolymer) into a constant volume of reactor simultaneously with an aqueous catalyst solution of constant composition. Under conditions of constant temperature, pressure and constant ratio of total monomers fed to the polymerization initiator, a constant conversion of the monomers ot copolymers results. In either the batch or the continuous process the quantity of initiator employed may be as low as about 0.001% and as high as about 5%, although preferably from 0.001% to 2%, based on the weight of the monomers, will be employed.

Admixing the polymeric constituents can be accomplished in any manner as long as a thorough blending of the copolymer and polyarylene polyether is obtained. For example, admixing may be accomplished by a variety of methods normally employed for incorporation of plasticizers or fillers into thermoplastic materials including but not limited to mixing rolls, doughmixers, Banbury mixers, extruders, and other mixing equipment. The resulting mixtures may be handled in any conventional manner employed for the fabrication or manipulation of thermoplastic polymers. The mixtures can be molded using compression injection calendering and extrusion techniques. Alternatively, the admixing may be accomplished by mixing solutions of the two polymers which may thereafter be treated with a non-solvent to effect coprecipitation. Precipitated mixtures may then be recovered in a dry state after filtration to remove the non-solvent and final evaporation of residual solvent. Dry blending a mixture of the individual polymers followed by thermal fusion is a convenient means for producing a conventional molding compound. In this procedure, the dry blend may be extruded and chopped into pellets for subsequent use in injection molding procedures.

It has been found that the incorporation of a small amount, e.g. up to about 8 parts by weight, of finely divided silica promotes the formation of a homogeneous mixture.

The mixtures of this invention may contain other additives to plasticize, extend, lubricate, prevent oxidation or lend color ot the mixtures. Such additives are well known in the art and may be incorporated without departing from the scope of the invention.

Also the mixtures of this invention can contain from 0.5 to 2 parts by weight per 100 parts by vinylidene fluoridehexafluoropropene copolymer of a cycloaliphatic polyamine as a cross-linking agent for the copolymer as is described in detail in U.S. Patent 2,933,481.

Because of their excellent physical, mechanical, chemical, electrical, and thermal properties, the mixtures of this invention have many and varied uses. For example, they can be used in molding powder formulations either alone or mixed various fillers to make molded parts and articles such as gear, ratchets, bearings, cams, impact parts, gaskets, valve seats, bottles, containers, and the like. They can be used to prepare molded, calendered or extruded articles, films, coatings, threads, filaments, tapes and the like. They can be applied to a broad spectrum of uses in form of sheets, rods, tapes and the like and are useful in electrical applications.

Because of the adhesive characteristics of the mixtures of this invention, they can be advantageously employed in one or more decorative, protective, structural or bonding capacities to provide structural elements comprising an adherend and an adherent mixture of copolymer and polyarylene polyether as described herein.

The terms "structural element" and "structural elements" as used herein refer to an assembly or assemblies of one or more discrete, planar, curvilinear, rectangular, round or odd shaped objects and a polymeric mixture of this inventiion. The assembly is characterized by an adhesive bond between a mixture and the object or objects. The terms comprehend, therefore, structural elements comprising an adherend, such as a substrate and an adhering layer of polymeric mixture as in a two-ply laminate or a coated substrate; structural elements comprising an interlayer of polymeric mixture sandwiched between and adhered to two similar or dissimilar adherends or laminae as in a plural ply laminate; structural elements comprising a polymeric mixture matrix surrounding and adhered to as a bond and/or a support for variously shaped and sized adherends such as articles of varying porosities, for example, as the bonding agent and/or substrate in fiber-reinforced plastic articles; structural elements comprising structural members bonded together either closely adjacent or spaced apart by polymeric mixture elements; and combinations of the foregoing. The adherend preferably is readily wettable by the polymeric mixture either because of a polar nature such as characterizes metals, glass and wood and is absent in polyethylene or because or surface treatment or cleanliness or for any other reason.

Adherends having a tangible surface or surfaces, preferably a tangible wettable surface or surfaces, to which polyarylene polyether-copolymer mixtures readily adhere include metals, polar materials, vitreous materials, proteinaceous materials, cutaneous materials, cellulosic materials, natural resins, synthetic organic polymeric material, non-metallic materials, and the like. Adherends can be particulate, granular, fibrous, filamentary, ropy, woven, nonwoven, porous, nonporous, rigid and nonrigid.

In one ombodiment, the mixtures of this invention are advantageously formed into sheets which are subsequently formed against an original shape such as a copper etched printing plate to form a matrix. The depth of an impression made in a matrix is more commonly referred to in the art as a "floor." Thus a matrix having an impression 30 mils deep is referred to as a matrix having 30 mil floor. In the copending application of J. B. Wheeler II, Ser. No. 365,797, filed May 7, 1964, there is described a thermoplastic matrix formed from a sheet of polyarylene polyether as described herein. The manner of forming such a matrix and the molding of duplicates from the matrix are also described in said application. It has been found however, that when sheets of polyarylene polyether are formed into a matrix, because of the low notched impact strength of the polyarylene polyether, the matrix tends to crack and even break in extreme cases when it is separated from the original against which it was formed. It has now been discovered that matrices formed from the mixtures of this invention will not break or crack when separated from an original.

Films formed from the mixtures of this invention by conventional techniques are useful as wrappings or packaging materials, as liners, for containers, covers, closures, and the like, as electrical insulating tapes, pipe coverings, and the like.

Because of their desirable electrical properties, the mixtures of this invention can be used as an insulating material for electrical conductors such as wire and cable, as slot insulation in dynamoelectric machines, as surface coverings for appliances and the like, as coatings for rods and the like, in wire enamels, varnishes, paints and the like. It has also been found that irradiation of the mixtures of this invention crosslinks the copolymer therein thereby improving toughness. A dosage of from 1 to 20 megareps. is usually sufficient to impart improved toughness.

The following examples are intended to further illustrate the present invention without limiting the same in any manner. Parts and percentages given are by weight unless indicated otherwise.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced Viscosity} = \frac{t_s - t_o}{c \cdot t_o}$$

wherein:

$t_o$ is the efflux time of the pure solvent.
$t_s$ is the efflux time of the polymer solution.
$c$ is the concentration of the polymer solution expressed in terms of grams of polymer per 100 ml. of solution.

Example I.—Preparation of thermoplastic polyarylene polyether

In a 250 ml. flask equipped with a stirrer, thermometer, a water cooled condenser and a Dean Stark moisture trap filled with benzene, there were placed 11.42 grams of 2,2-bis (4-hydroxyphenly) propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture at 130–135° C. consisting of the dipotassium salt of the 2,2-bis(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130–140° C. with good stirring for 4–5 hours. The viscous, orange solution was poured into 300 ml. water, rapidly circulating in a Waring Blendor, and the finely divided white polymer was filtered and then dried in a vacuum oven at 100°, for 16 hours. The yield was 22.2 g. (100%) and the reaction was 99% complete based on a titration for residual base.

The polymer had the basic structure

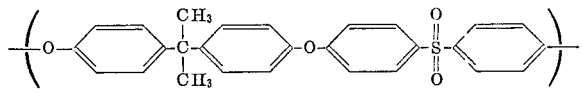

Example 2.—Preparation of a 60–40 copolymer of vinylidene fluoride and hexafluoropropene Hexafluoropropene is passed at a rate of 2 pounds per hour and vinylidene fluoride at 3 pounds per hour into a one gallon stainless steel constant volume reactor which is equipped with an agitator, two inlet lines and an outlet line leading to a receiver. The above monomers are introduced simultaneously through one inlet line which extends to near the bottom of the reactor. Similtaneously the initiator-dispersant solution made up of:

135 parts of ammonium persulfate
27 parts of sodium bisulfate
284 parts of disodium hydrogen phosphate
30 parts of ammonium perfluorooctanoate, and
21,000 parts of deoxygenated water is pumped at a rate of 1.06 gallons per hour into the reactor through the other inlet line near its top. The reaction mass is agitated continuously and maintained at 100° C. and 900 p.s.i The outlet line, which leads from the top of the reactor, is connected to a receiver for the product through a pressure release valve. A pressure of 900 p.s.i. is maintained in the reactor. When the pressure in the reactor exceeds the 900 p.s.i. a steady stream of copolymer emulsion escapes from the reactor through the outlet line into the receiver (which is conveniently at atmospheric pressure). The latex obtained after the second hour of operation is coagulated by the addition of sodium chloride, and the water-soluble copolymer is collected, washed with water and dried. Analysis shows the copolymer to be made up of 40% hexafluoropropene units and 60% vinylidene fluoride units by weight.

Example 3

Ten parts of the copolymer prepared as in Example 2 were admixed in a Banbury mixer with 90 parts of polyarylene polyether prepared as in Example 1 having a RV of 0.66 and a melt flow of 1.53 decigrams per minute at 350° C. and 44 p.s.i. (ASTM D1238–57T). A compression molded sample of this mixture had the following properties as compared to the control which was compression molded from unmodified polyarylene polyether having the same properties as above:

|  | Example 3 | Control |
|---|---|---|
| Izod Impact at 72° F., 1/8" spec., ft.-lb./in. notch (ASTM D256) | 18.4 | 1.3 |
| Tensile Impact, ft.-lb./in.³ (ASTM D1822) | 567 | 498 |
| Tensile elongation at Break, Percent (ASTM D638) | 113 | 84 |
| Tensile strength at yield, p.s.i. (ASTM D638) | 7,980 | 9,860 |
| Tensile strength at break p.s.i. (ASTM D638) | 7,760 | 8,420 |
| Heat distortion temperature at 264 p.s.i.,° C (ASTM D648) | 171 | 171 |

This example demonstrates the vast improvement in impact strength and tensile elongation gained by incorporating the copolymer into the polyarylene polyether and also demonstrates that it does not substantially effect the other properties of the polymer such as the tensile properties and heat distortion temperature.

Examples 4–6

Polyarylene polyether having a RV of 0.62 prepared as in Example 1 was fluxed at 280° C. in a Brabender plastograph. Various amounts of the copolymer prepared as in Example 2 was then added with finely divided silica in some cases. Twenty mil test plaques were compression molded at 550° F. and were tested against an unmodified control for thermal stress embrittlement by measuring the tensile properties (ASTM D638) before and after thermal stressing at 125° C. for 30 minutes under a load equal to 20% of the average yield strength for each compound. Results are summarized below.

the control sample had undergone severe thermal stress embrittlement as was evidenced by multiple cracks in the wire coating. After four days the modified sample showed no evidence of thermal stress embrittlement.

Example 8

The mixture of Example 5 was compression molded into a 10 mil plaque, tested for tensile properties, irradiated with a dosage of 10 megareps., and tested again for tensile properties. Results are summarized below.

|  | Before Irradiation | After Irradiation |
|---|---|---|
| Tensile strength at yield, p.s.i. | 8,050 | 7,770 |
| Tensile strength at break, p.s.i. | 7,040 | 7,320 |
| Tensile elongation, percent | 25 | 50 |
| Tensile Impact, ft.-lb./in.³ | 161 | 333 |

This example demonstrates that irradiation of mixtures of this invention produces an increase in toughness as is evidenced by the improvement in elongation and impact without degrading the tensile strengths.

Example 9

Thermoplastic polyarylene polyether composed of recurring units having the formula $$-\left(O-\underset{}{\bigcirc}-SO_2-\underset{}{\bigcirc}\right)-$$

is prepared from 4,4′-dihydroxydiphenylsulfone and 4,4′-dichlorodiphenylsulfone according to the procedure of Example 1. A mixture prepared from this polymer and

| Example No. | Percent Vinylidene Fluoride Hexafluoro Propene Copolymer | Percent Silica | Before Thermal Stressing | | | After Thermal Stressing | | |
|---|---|---|---|---|---|---|---|---|
|  |  |  | Tensile Strength at Yield, p.s.i. | Tensile Strength at Break, p.s.i. | Tensile Elongation, percent | Tensile Strength at Yield, p.s.i. | Tensile Strength at Break, p.s.i. | Tensile Elongation, percent |
| 4 | 10 | 3.85 | 7,500 | 6,900 | 90 | 8,250 | 7,120 | [1] 29 |
| 5 | 5 | 2.96 | 8,330 | 7,290 | 67 | 9,410 | 8,200 | [1] 34 |
| 6 | 10 | 0 | 7,810 | 7,470 | 94 | 8,460 | 7,180 | [1] 22 |
| Control | 0 | 0 | 9,900 | 8,100 | 67 | 10,200 | 8,100 | [2] 22 |

[1] Ductile breaks. [2] Half brittle breaks.

Improved resistance to thermal stress embrittlement is demonstrated by these examples by the elongation after stressing and the fact that ductile breaks occurred in the examples whereas brittle breaks occurred in the control.

Example 7

2610 parts of polyarylene polyether prepared as in Example 1 having a RV of 0.66 were compounded with 290 parts of the copolymer of Example 2 in a Banbury mixer. The mixture was dried for 20 hours at 250° F. and then extruded onto wire at a stock temperature of 680° F. without any degradation of the mixture. "Pigtail" samples of the coated wire wound upon itself, and a control sample of wire coated with unmodified polyarylene polyether, were placed in an oven at 170° C. After one day 3 percent of the copolymer of Example 2 exhibits an improvement in notched impact strength and an improvement in resistance to thermal stress embrittlement as compared to the unmodified polymer.

Example 10

Thermoplastic polyarylene polyether composed of recurring units having the formula $$\left[O-\underset{}{\bigcirc}-\underset{\underset{C_6H_5}{|}}{\overset{\overset{CH_3}{|}}{C}}-\underset{}{\bigcirc}-O-\underset{}{\bigcirc}-SO_2-\underset{}{\bigcirc}\right]-$$

is prepared from the bisphenol of acetophenone and 4,4′-dichlorodiphenylsulfone according to the procedure of Example 1. A mixture prepared from this polymer and 7 percent of the copolymer of Example 2 exhibits an improvement in notched impact strength and an improvement in resistance to thermal stress embrittlement as compared to the unmodified polymer.

Example 11

Thermoplastic polyarylene polyether composed of recurring units having the formula

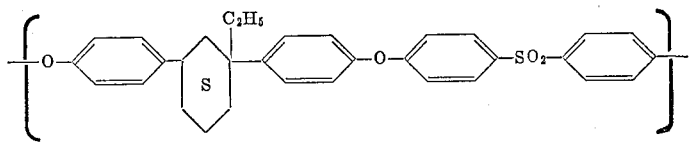

is prepared from the bisphenol of vinyl cyclohexene (prepared by an acid catalyzed condensation of 2 moles of phenol and one mole of vinyl cyclohexene) and 4,4'-dichlorodiphenylsulfone according to the procedure of Example 1. A mixture prepared from this polymer and 20 percent of the copolymer of Example 2 exhibits an improvement in notched impact strength and in improvement in resistance to thermal stress embrittlement as compared to the unmodified polymer.

Example 12

Thermoplastic polyarylene polyether composed of recurring units having the formula

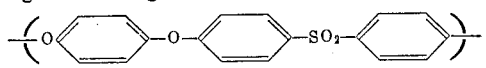

is prepared from hydroquinone and 4,4'-dichlorodiphenylsulfone according to the procedure of Example 1. A mixture prepared from this polymer and 13 percent of the copolymer of Example 2 exhibits an improvement in notched impact strength and an improvement in resistance to thermal stress embrittlement as compared to the unmodified polymer.

Example 13

Thermoplastic polyacrylene polyether composed of recurring units having the formula

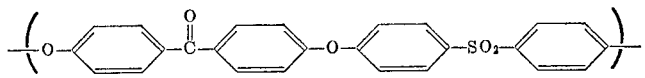

is prepared from 4,4'-dihydroxybenzophenone and 4,4'-dichlorodiphenylsulfone according to the procedure of Example 1. A mixture prepared from this polymer and 10 percent of the copolymer of Example 2 exhibits an improvement in notched impact strength and an improvement in resistance to thermal stress embrittlement as compared to the unmodified polymer.

Example 14

Thermoplastic polyarylene polyether composed of recurring units having the formula

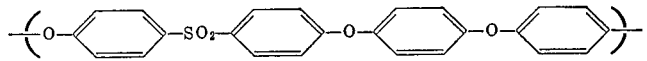

is prepared from 4,4'-dihydroxydiphenylether and 4,4'-chlorodiphenylsulfone according to the procedure of Example 1. A mixture prepared from this polymer and 2 percent of the copolymer of Example 2 exhibits an improvement in notched impact strength and an improvement in resistance to thermal stress embrittlement as compared to the unmodified polymer.

Example 15

Thermoplastic polyarylene polyether composed of recurring units having the formula

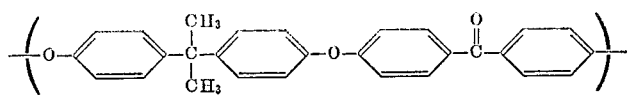

is prepared from 2,2'-bis-(4-hydroxyphenyl)propane and 4,4'-difluorobenzophenone according to the procedure of Example 1. A mixture prepared from this polymer and 30 percent of the copolymer of Example 2 exhibits an improvement in notched impact strength and an improvement in resistance to thermal stress embrittlement as compared to the unmodified polymer.

What is claimed is:

1. Polymeric mixture characterized by improved impact strength and improved resistance to thermal stress embrittlement comprising from about 0.1 to about 30 parts by weight of a vinylidene fluoride-hexafluoropropene copolymer containing from 30 percent to 70 percent by weight of vinylidene fluoride units and 70 percent to 30 percent by weight of hexafluoropropene units and a linear thermoplastic polyarylene polyether composed of recurring units having the formula

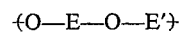

wherein E is the residuum of a dihydric phenol and E' is the residuum of a benzenoid compound having an inert electron withdrawing group having a sigma* value about 0.7 in at least one of the positions ortho and para to the valence bonds, and where both of said residua are valently bonded to the ether oxygens through aromatic carbon atoms.

2. Mixture defined in claim 1 wherein said polyarylene polyether is composed of recurring units having the formula

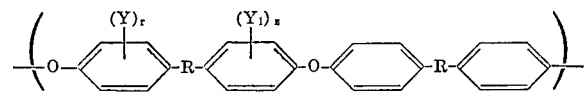

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where R and z are integers having a value from 0 to 4 inclusive.

3. Mixture defined in claim 1 wherein said polyarylene polyether is composed of recurring units having the formula

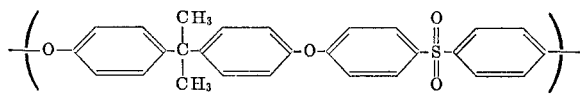

4. Mixture defined in claim 1 wherein said polyarylene polyether is composed of recurring units having the formula

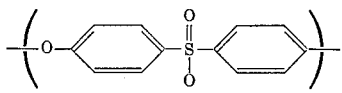

5. Mixture of claim 1 irradiated with a dosage of from 1 to 20 megareps.

6. A structural element comprising an adherend and adhering thereto a mixture of from about 0.1 to about 30 parts by weight of a vinylidene fluoride-hexafluoropropene copolymer containing from 30 percent to 70 percent by weight of vinylidene fluoride units and 70 percent to 30 percent by weight of hexafluoropropene units and a linear thermoplastic polyarylene polyether composed of recurring units having the formula

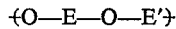

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

7. Structural element of claim 6 wherein said thermoplastic polyarylene polyether is composed of recurring units having the formula

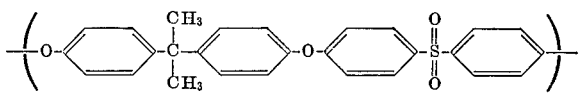

8. Structural element of claim 6 wherein said thermoplastic polyarylene polyether is composed of recurring units having the formula

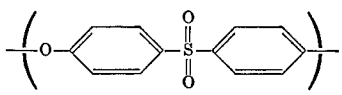

9. Structural element of claim 6 irradiated with a dosage of from 1 to 20 megareps.

10. Electrical insulating material comprising a mixture of from about 0.1 to about 30 parts by weight of a vinylidene fluoride-hexafluoropropene copolymer containing from 30 percent to 70 percent by weight of vinylidene fluoride units and 70 percent to 30 percent by weight of hexafluoropropene units and a linear thermoplastic polyarylene polyether composed of recurring units having the formula

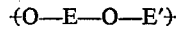

wherein E is the residuum of a dihydric phenol and E' is the residuum of a benzenoid compound having an inert electron withdrawing group having a sigma* value about 0.7 in at least one of the positions ortho and para to the valence bonds, and where both of said residua are valently bonded to the ether oxygens through aromatic carbon atoms.

11. Electrical conductor coated with an insulating material comprising a mixture of from about 0.1 to about 30 parts by weight of a vinylidene fluoride-hexafluoropropene copolymer containing from 30 percent to 70 percent by weight of vinylidene fluoride units and 70 percent to 30 percent by weight of hexafluoropropene units and a linear thermoplastic polyarylene polyether composed of recurring units having the formula

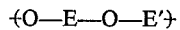

wherein E is the residuum of a dihydric phenol and E' is the residuum of a benzenoid compound having an inert electron withdrawing group having a sigma* value about 0.7 in at least one of the positions ortho and para to the valence bonds, and where both of said residua are valently bonded to the ether oxygens through aromatic carbon atoms.

12. Electrical conductor of claim 11 irradiated with a dosage of from 1 to 20 megareps.

13. Molded structure comprising a mixture of from about 0.1 to about 30 parts by weight of a vinylidene fluoride-hexafluoropropene copolymer containing from 30 percent to 70 percent by weight of vinylidene fluoride units and 70 percent to 30 percent by weight of hexafluoropropene units and a linear thermoplastic polyarylene polyether composed of recruiting units having the formula

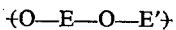

wherein E is the residuum of a dihydric phenol and E' is the residuum of a benzenoid compound having an inert electron withdrawing group having a sigma* value about 0.7 in at least one of the positions ortho and para to the valence bonds, and where both of said residua are valently bonded to the ether oxygens through aromatic carbon atoms.

14. Molded structure of claim 13 irradiated with a dosage of from 1 to 20 megareps.

15. Matrix formed from a sheet comprising a mixture of from about 0.1 to about 30 parts by weight of a vinylidene fluoride-hexafluoropropene copolymer containing from 30 percent to 70 percent by weight of vinylidene fluoride units and 70 percent to 30 percent by weight of hexafluoropropene units and a linear thermoplastic polyarylene polyether composed of recurring units having the formula

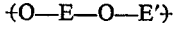

wherein E is the residuum of a dihydric phenol and E' is the residuum of a benzenoid compound having an inert electron withdrawing group having a sigma* valve about 0.7 in at least one of the positions ortho and para to the valence bonds, and where both of said residua are valently bonded to the ether oxygens through aromatic carbon atoms.

16. Matrix of claim 15 wherein said sheet has a thickness of not greater than 75 mils and said matrix has a floor of not greater than 30 mils.

17. Molded structure of claim 15 irradiated with a dosage of from 1 to 20 megareps.

References Cited

UNITED STATES PATENTS

| | | | |
|---|---|---|---|
| 3,291,864 | 12/1966 | Eldridge | 260—900 |
| 3,264,536 | 8/1966 | Robinson et al. | 260—49 |
| 2,979,418 | 4/1961 | Dipner | 260—900 |

MURRAY TILLMAN, *Primary Examiner.*

J. T. GOOLKASIAN, *Assistant Examiner.*